No. 703,427. Patented July 1, 1902.
F. & W. KNÖBEL.
DOG CART.
(Application filed Nov. 1, 1901.)
(No Model.)
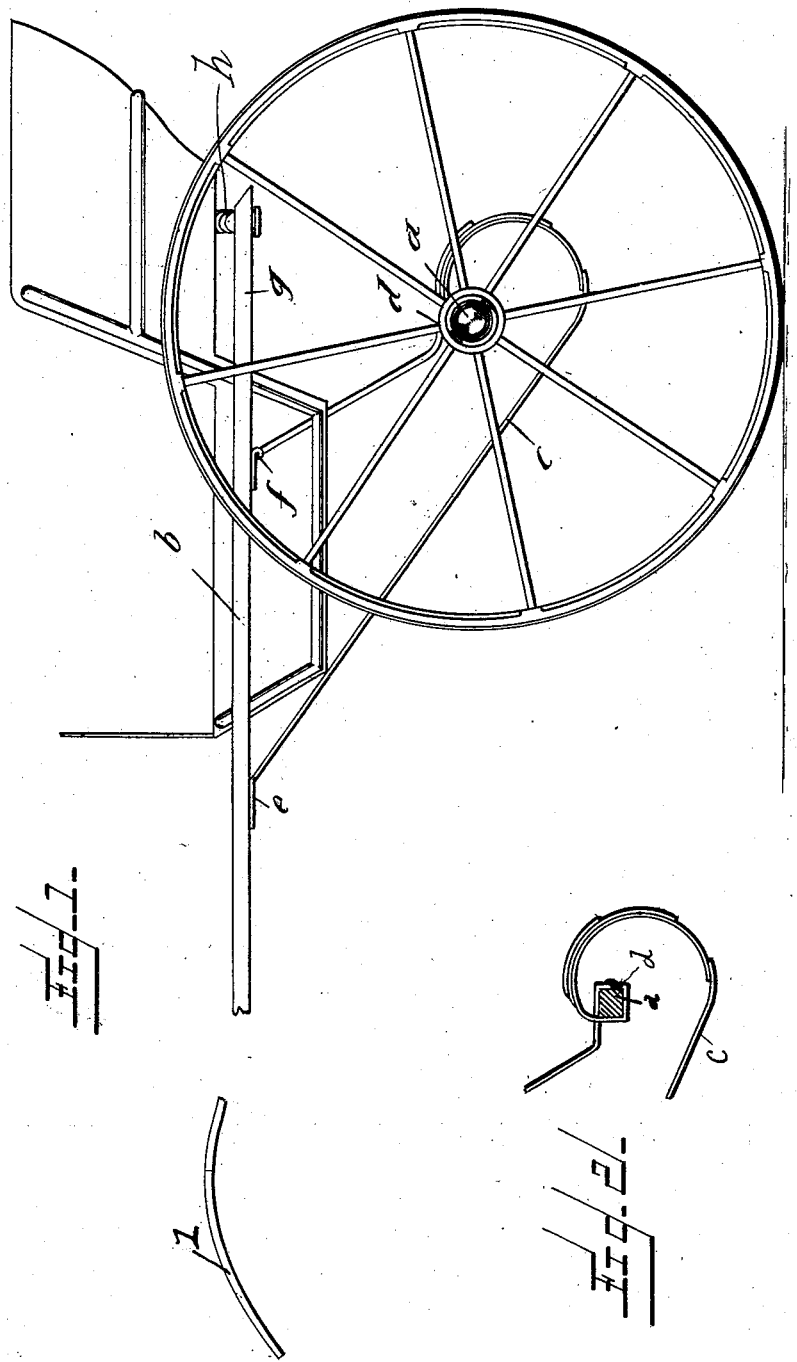

UNITED STATES PATENT OFFICE.

FRANZ KNÖBEL AND WILHELM KNÖBEL, OF WIEDENBRÜCK, GERMANY.

DOG-CART.

SPECIFICATION forming part of Letters Patent No. 703,427, dated July 1, 1902.

Application filed November 1, 1901. Serial No. 80,731. (No model.)

*To all whom it may concern:*

Be it known that we, FRANZ KNÖBEL and WILHELM KNÖBEL, subjects of the Emperor of Germany, and residents of Wiedenbrück, Germany, have invented certain new and useful Improvements in Dog-Carts and the Like, of which the following is a specification.

The object of this invention is an improvement in dog-carts and the like, consisting of a special arrangement of the springs connecting the axle to the shafts of the vehicle. This arrangement permits the suspension of the box of the vehicle in a more convenient manner than has hitherto been possible.

In the accompanying drawings, Figure 1 is a side elevation of a dog-cart made in accordance with our invention; and Fig. 2 is a detail view of the spring and axle, the latter in cross-section.

As may be seen, the springs connecting the axle $a$ of a vehicle to the shafts $b$ have not the usual flat shape, but are curved and surround the axle $a$, being fixed thereto at $d$. The free ends of this spring may be rigidly connected to the shafts $b$ or only one end $e$ is rigidly fixed, as shown in the drawings, while the other end $f$ is pivotally suspended—for instance, by means of a chain-link. The fixing-point $f$ is chosen in order that the rear ends $g$ of the shafts may project, and upon these ends bears a cross-spring $h$, supporting the body of the vehicle. In this way the weight of the vehicle-body acting upon the ends of the shafts lessens the burden on the horse. Moreover, this arrangement permits the use of the natural elasticity of the wooden portion of the shafts, an elasticity which may be increased when the ends terminating the shafts are of steel, forming springs, as at $l$. The portion $df$ of the suspension-spring can be made of iron, while the parts $d$ $e$ should in any case be made of spring-steel.

The one end of the spring extends in the same plane throughout at an acute angle to the rear end of the shaft to a point beneath the axle. The spring from that point extends upwardly and encircles the axle, to which it is rigidly secured. The other end of the spring is pivotally secured to the shaft to the rear of the first-named end and likewise at an acute angle to the rear of the shaft.

Having now fully described our invention, what we desire to secure by Letters Patent is—

In a dog-cart, the combination with the shafts, of a spring one end of which is rigidly secured to said shaft, at an acute angle to the rear end thereof, said end of the spring extending to a point beneath the axle in the same plane throughout, said end encircling the axle and being rigidly secured thereto, the other end of said spring being pivotally connected to the shaft with its rear end at an angle to the rear end of the shaft, and a spring connected to the rear extremities of said shafts and engaging the lower face of the body of the cart, substantially as described.

In testimony whereof we have hereunto set our hands in presence of two witnesses.

FRANZ KNÖBEL.
WILHELM KNÖBEL.

Witnesses:
L. KASCH,
C. C. STEVENSON.